United States Patent [19]

Hochberg, deceased et al.

[11] 4,046,074
[45] Sept. 6, 1977

[54] NON-IMPACT PRINTING SYSTEM

[75] Inventors: Frederick Hochberg, deceased, late of Yorktown, by Lee Hochberg, administratrix; Keith Samuel Pennington, Somers, both of N.Y.

[73] Assignee: International Business Machines Corporation, Armonk, N.Y.

[21] Appl. No.: 654,322

[22] Filed: Feb. 2, 1976

[51] Int. Cl.² .................. G01D 15/18; B41M 5/20
[52] U.S. Cl. .................. 101/426; 346/74.1; 197/1 R; 239/310; 346/135; 427/27; 427/32; 204/2
[58] Field of Search .................. 197/1 R; 101/426; 346/1 R, 74 E, 135, 136; 118/7, 46, 48, 49.1, 49.5, 50.1, 300, 310–311, 313, 315; 427/27, 29, 32, 33, 150, 420, 421, 424, 426; 156/4, 237–240; 239/310, 311, 317, 338–340, 346, 369, 370; 204/2, DIG. 1

[56] References Cited

U.S. PATENT DOCUMENTS

| | | | |
|---|---|---|---|
| 3,336,903 | 8/1967 | Point | 427/27 X |
| 3,462,083 | 8/1969 | Kautz | 427/426 X |
| 3,622,468 | 11/1971 | Turner et al. | 204/2 |
| 3,654,095 | 4/1972 | Koontz et al. | 204/2 |
| 3,655,527 | 4/1972 | Curran et al. | 346/135 X |
| 3,676,197 | 7/1972 | Harrison et al. | 427/426 X |
| 3,702,001 | 10/1972 | Gassino et al. | 346/74 E |
| 3,811,935 | 5/1974 | Gould | 346/135 X |
| 3,813,677 | 5/1974 | Shimotsuma | 346/135 X |
| 3,816,838 | 6/1974 | Higaki et al. | 346/135 X |
| 3,857,470 | 12/1974 | Bastard et al. | 346/135 X |
| 3,871,972 | 3/1975 | Sekine | 427/150 X |
| 3,901,443 | 8/1975 | Mitsui et al. | 239/338 X |
| 3,905,876 | 9/1975 | Yoshino et al. | 346/135 X |
| 3,916,077 | 10/1975 | Damrau | 427/424 X |
| 3,918,640 | 11/1975 | Piccino et al. | 239/338 X |
| 3,936,361 | 2/1976 | Takatori et al. | 346/135 X |
| 3,937,175 | 2/1976 | Horner | 118/7 |
| 3,951,757 | 4/1976 | Yoshino et al. | 346/135 X |

*Primary Examiner*—E. H. Eickholt
*Attorney, Agent, or Firm*—Roy R. Schlemmer, Jr.

[57] ABSTRACT

A process and apparatus are presented for making in-situ an energy sensitive surface on a passive support medium from at least two materials which in combination render said surface energy sensitive, comprising means for forming a separate mist of each of said materials and causing said separate mist to simultaneously contact said support media so that said materials controllably mix as they strike said medium. The particular process is utilized in a printing, copying and or recording environment wherein, said energy sensitive surface is formed on-line immediately prior to exposing said surface to an energy source. Said mists may be mixed at the point of contact with said medium or premixed within said mist forming means prior to striking said support medium.

16 Claims, 11 Drawing Figures

NON-IMPACT PRINTING SYSTEM

BACKGROUND OF THE INVENTION

Modern business requires vast amounts of printed material large quantities of which are produced by one-shot or single copy printing processes. For low speed applications typewriter-type printing terminals have adequate speed and for opposite end of the printing spectrum extremely high speed mechanical, xerographic and other special line printers are available.

In the intermediate speed range such as for telegraphic or facsimile receiving terminals, relatively low speed computer output terminal printers etc., a large variety of printers are available. Among the many types of printers in this area are ink jet printers, high speed occulting print ball printers and various types of printing processes utilizing specially coated papers. In this latter class of printing method some form of energy is caused to react with the specially coated paper in a predetermined area to make a visible mark. The form of energy applied is typically an electric current passing through the paper, some form of heat or thermal reaction induced in the paper or a photochemical reaction due to the impingement of some form of radiant energy on the paper surface.

It is to the coated paper printing systems and methods to which the present invention applies. An inherent problem with such coated paper printing systems is the paper or record receiving media itself. It requires the use of special papers which must be supplied by the manufacturer which of necessity limits the choice of a printing customer. The handling and inventory of such special papers is quite expensive. Probably the greatest disadvantage with special recording papers is their limited shelf life. Depending on the particular type of chemicals in the system being used they are usually very sensitive to humidity and temperature variations as well as the loss of sensitivity due simply to the aging of the chemicals forming the coating on the paper.

As a consequence, even though the marking systems utilized i.e., the passage of a current through a discrete area or the heating of a discrete area, etc., is usually quite simple and straightforward for such systems, the problems with the record receiving media, i.e., the coated paper has severely limited the acceptance of such printing systems in the business community.

What is needed in this particular technology is some means whereby conventional previously untreated paper could be satisfactorily used in the printing process so that such process would be competitive with other printing systems such as typewriter-type terminals, ink jet printing, xerographic printing systems and the like.

It has been found that greatly improved printing and-/or recording is possible utilizing an energy absorbtive coating on the recording medium wherein the coating material is applied real time in-situ immediately prior to the printing operation. Utilizing the concepts of the present invention two or more different constituent materials may be nebulized and directly sprayed upon a sheet of paper or other suitable recording medium immediately prior to exposing said coating to an external energy source for the purpose of marking same. The instant printing system eliminates the problems of shelf like of precoated papers, it also allows the use of coatings which would have been impractical when shelf life was a consideration. It further allows a much greater latitude in the choice of paper to be used in the printing process.

The primary object of the present invention is to provide a coated paper printing system wherein the coating is formed real time immediately prior to the printing operation.

It is another object of the invention to provide such a printing system wherein the coating is formed from at least two separate constituent materials.

It is a still further object of the invention to provide such a printing system wherein problems of shelf life of the coated paper are eliminated.

It is yet another object of the invention to provide such a printing system which is adaptable for use with many different visible mark producing systems.

These and other objects, features and advantages of the invention will be apparent from the following description of the invention.

DESCRIPTION OF THE PREFERRED EMBODIMENTS

The objects of the present invention are accomplished in general by a non-impact printing system utilizing an external energy source which forms marks as the energy is applied to the surface of a coated support medium such as paper. The unique feature of the present concept is the on-line forming of a coating on the paper in-situ with respect to the actual printing operation. This is accomplished by applying the necessary constituents for the reactive coating directly on the paper as a mist or vapor immediately prior to the application of the marking energy from a suitable source.

The basic concepts of the present invention may readily be applied to many different types of marking or recording technologies such as electrolytic, thermographic, photochemical electroless plating and other marking systems wherein the common requirement is the need for a specially coated or treated paper which reacts by forming a visible mark upon the selective actuation of said energy source.

Similarly, a wide variety of actual physical apparatus may be employed for the application of the energy and also for the application of the coating materials. It should be understood that the disclosed embodiments represent preferred forms of the invention, however, it should also be understood that many other possibilities exist.

Figure 1:
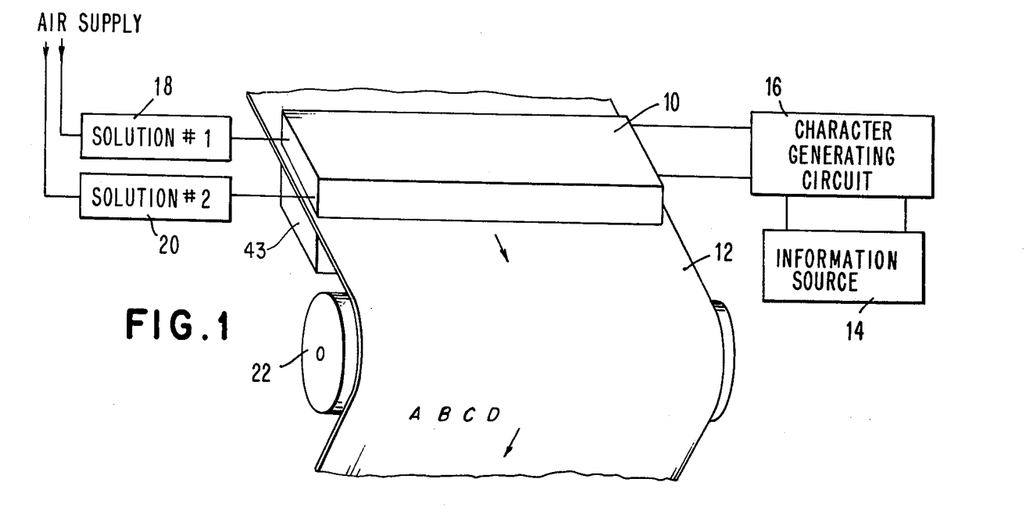
FIG. 1 is a perspective view of a line printer together with a block diagram of associated control circuitry for a printing system embodying the principles of the present invention.

Referring first to FIG. 1 a perspective view is shown of a printing system incorporating the principles of the present invention. The combination coating and writing head 10 is shown mounted contiguously to the recording or printing support medium 12 which in a preferred embodiment is paper. The embodiment of FIG. 1 is a line printer wherein paper is fed past the marking head 10. The drive mechanism for such continuous sheet or web feeding is well known in the art and is not shown. The character information signals come from the information source 14 which could be a computer output, a facsimile signal source, a terminal keyboard or some other well known means. This information passes through the character generation circuitry block 16 which contains the necessary logic to form characters on a continuous line basis such as are extremely well known in the computer terminal and facsimile printer art. Blocks 18 and 20 represent containers and nebulizers for forming mists from two solutions suitable for forming the reactive coating on the paper 12. These are supplied to the combination coating and printing head 10 where the two compositions are continuously applied to the paper just prior to the printing operation. Depending upon the nature of the printing phenomenon a drying means could be interposed between the coating station and the printing station. In most situations, due to the rapid drying of aerosol coated papers as well as by suitably choosing solvents, paper surface and the like, this would not be necessary.

It will accordingly be appreciated that a continuous coating or layer is applied to the entire width of the paper and as the marking portion of the head 10 is energized by the character generation circuitry 16, individual dots or lines will be formed upon the coated paper to form alphanumeric characters, geometric figures or any other desired type of facsimile representation.

It will also be noted that the surface of the head 10 is flat to conform to the surface of the backup plate 43. However, this is for convenience only, since the roller 22 could also act as a backup platen for the printing operation. It will be readily appreciated that a curved concave surface for the marking head 10 would be required if the roller were to be used as the backup member.

Similarly, a single combination head 10 is disclosed as a preferred embodiment however, the coating station or device could be a separate mechanical entity located just up the stream from the printing or marking means. The coating mist may be applied either from a series of nozzles i.e. 50, 52 of FIG. 4A which cover the width of the support medium or by a slit type opening (not shown) which would accomplish the same purpose. Similarly, the mist may be premixed immediately prior to application to the paper as is shown in the embodiments of FIGS. 1, 2, 3A and 5A or alternatively separate nozzles and slits could be utilized to, essentially, mix the constituents of the coating directly on the surface of the support medium as in the embodiments of FIGS. 4A and 7.

Figure 2A:
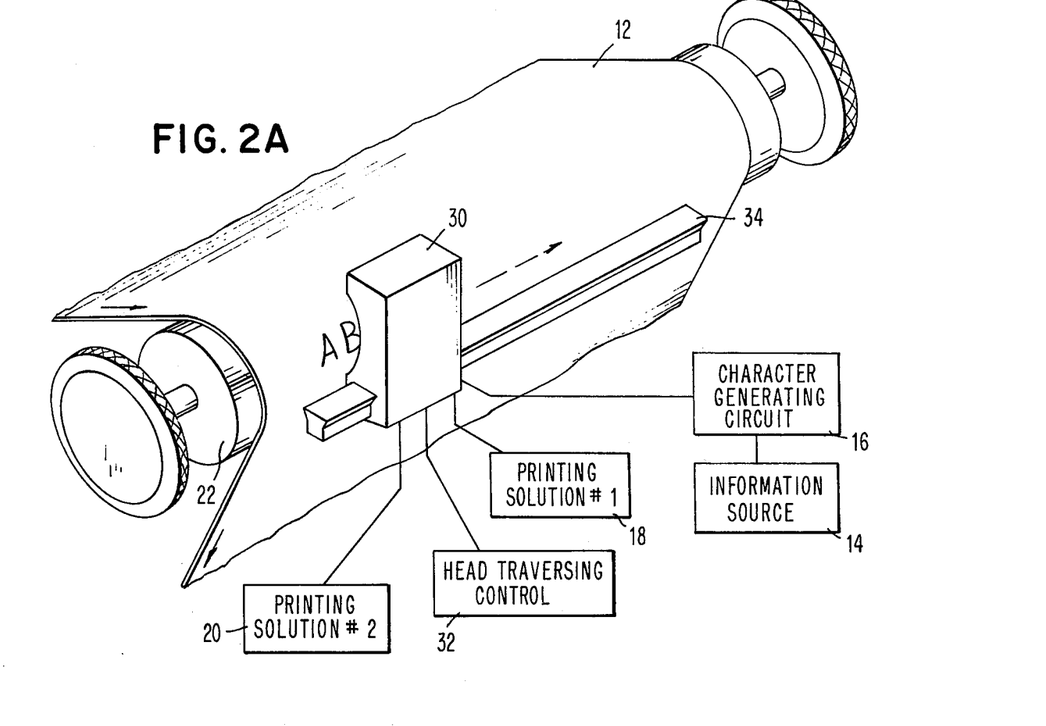
FIG. 2A comprises a perspective view of a printing system similar to FIG. 1 of an alternative form of printing device.

A somewhat different form of printer is disclosed in FIG. 2A. The basic concepts of the invention and their application to the printing embodiment are identical for the embodiment of FIG. 2A. However, the details of the printline generation are somewhat different. This embodiment utilizes a typewriter-like printing head 30, wherein the support medium 12 is indexed past the printing station or vice versa and the printer 30 prints a line of print at a time before the support medium 12 is indexed to a new line position. In this embodiment individual characters are generated individually rather than generated a complete line at a time as in the embodiment of FIG. 1. The character generating circuitry for this form of printing is notoriously old in the art of the area computer output terminal printers such as wire matrix printers and the like. The character generation circuitry 16 and the information source 14 in the embodiment of FIG. 2A operate in substantially the same manner as the same numbered blocks in FIG. 1 and form no necessary part of the present invention and are shown for purposes of illustrative embodiment. The head traversing control 32 operates in conjunction with the support track 34 to move the printing head 30 along track 34 to traverse the support medium 12 during the printing operations. The design principles of the printing heads 10 and 30 for both of these embodiments is substantially the same, however, the line printer mode usually would have more marking devices on the head in order to address each print position across the width of a page, for this reason the same reference numerals are utilized in both to indicate similar portions. The cross-sectional view FIG. 3B of the printhead 10 would be substantially identical for both of the embodiments.

Figure 2B:
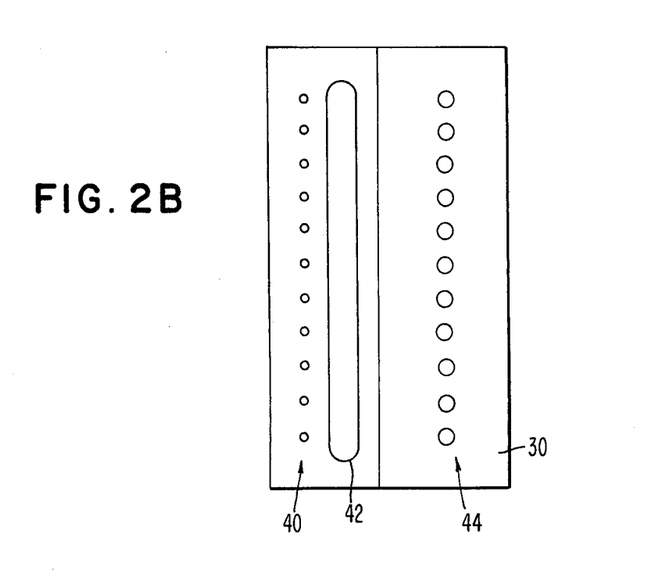
FIG. 2B is a bottom view of a printhead suitable for use in the embodiment of FIG. 2A.
Figure 3A:
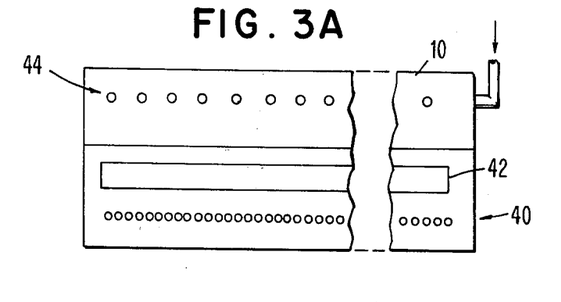
FIG. 3A is a bottom view of a combination coating and printing head suitable for use with the embodiment of FIG. 1.
Figure 3B:
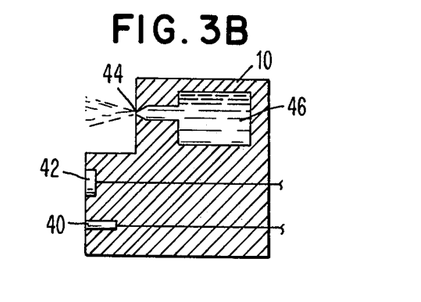
FIG. 3B is a cross sectional view of the combination head of FIG. 3A.

Referring to both FIGS. 2B and 3A these heads are utilized for what is generally referred to as electrolytic or electrochemical recording wherein the action of an electric current passing through the chemical coating of the paper causes a mark to be made. The marking members may comprise a series of wires or conductors 40 which are embedded in the body of the marking head 10 (30). These individual conductors are appropriately connected to the character generating circuitry 16 for selective actuation as required to make a mark. The member 42 as shown serves as a common electrode for the current flow in the marking or recording arrangement. This member is shown somewhat exaggerated both in size and spacing in the embodiment and could actually be much smaller and placed much more closely to the embedded wires 40. By placing the common electrode 42 on the same side of the paper as the marking electrode 40, only the surface of the paper need be coated, which greatly reduces the quantity of chemicals needed, paper requirements, marking currents, drying time, etc.

Referring again to FIGS. 2B and 3A it will be noted that the reference numeral 44 designates a series of orifices 44 are connected to a plenum chamber 46 which contains a premixed coating solution in an aerosol mist form which is supplied to the marking head from the elements 18 and 20. This mist supplied to the head 10 under pressure passes out through the nozzles 44 to coat the surface of the paper immediately prior to the printing or marking operation. The embodiment of FIGS. 2B and 3A presumes that the coating solution has been premixed through some means such as will be described subsequently with respect to FIG. 7. Alternatively the solutions may be supplied separately to two sets of nozzles such as shown in simplified form in FIGS. 4A and 4B.

Figure 4A:
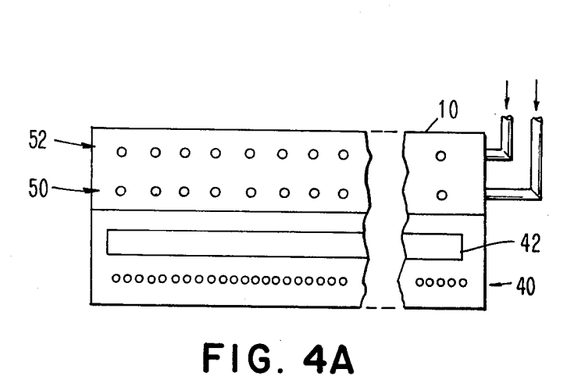
FIG. 4A is a bottom view of an alternative form of a combination coating and printing head, similar to that shown in FIG. 3A.
Figure 4B:
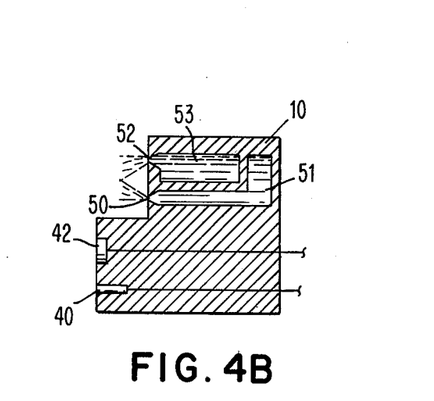
FIG. 4B is a cross-sectional view of the combination head of FIG. 4A.

In the embodiment of FIGS. 4A and 4B it will be noted that there are two rows of nozzles. Referring specifically to FIG. 4B the nozzles 50 are connected to plenum chamber 51 and the nozzles 52 are connected to plenum chamber 53. Each of these chambers would be supplied with a separate consitituent of the ultimate coating mixture in separate aerosol mist form supplied under pressure from the devices 18 and 20 of FIG. 1. Thus, as will be apparent, the paper or support medium passing under the marking head 10 would receive a fine spray of the solutions 1 and 2 from each of the sets of nozzles 50 and 52.

With both embodiments the heads 10 are indicated as being in intimate or touching contact with the support medium. As will be apparent, adjustments would have to be made in the arrangement to assure that the complete surface of the support material is uniformly covered with the spray mist. Thus the portion of the head containing the nozzles is shown set back a distance from the paper in order to get requisite divergence of the spray. Conversely, a narrow slit could be utilized which completely covers the width of the support medium desired, said slit directly communicating with the plenum chamber 46. Obviously, there would be two slits in the embodiment of the FIG. 4A.

Figure 7:
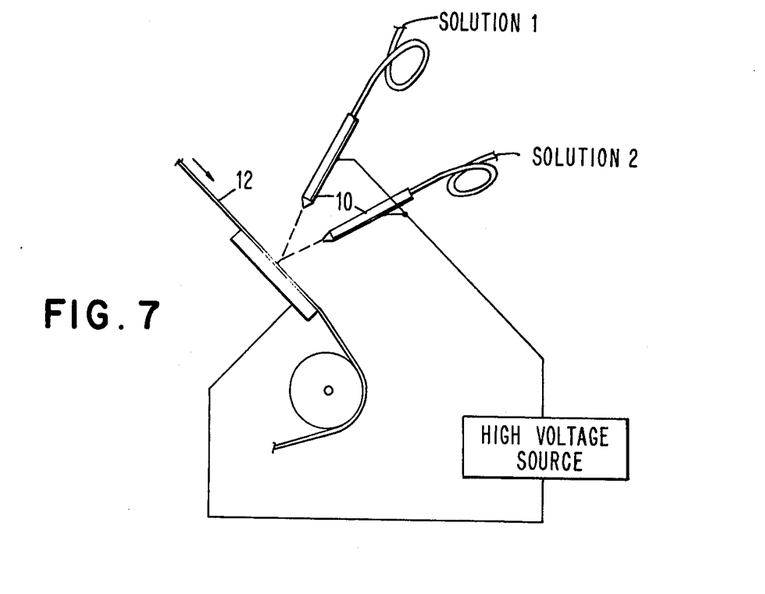
FIG. 7 illustrates a biasing method for enhancing the adherence of the coating mist on the support medium.

In addition to the composite head arrangement shown in FIGS. 1 and 2A it would be possible to utilize a series of individual nozzles such as indicated in FIG. 7. Again, the only requirement is that there be enough nozzles to uniformly cover the surface of the support medium with both solutions and in order to get optimum marking results.

Figure 5A:
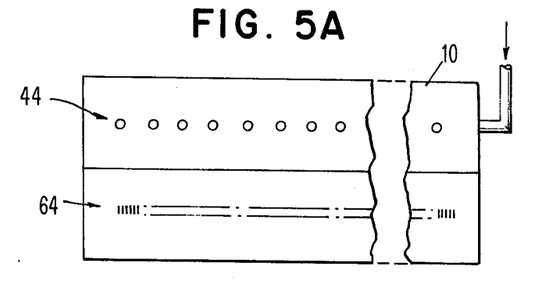
FIG. 5A is a bottom view of a combination coating and printing head similar to that of FIG. 3A but adapted for use in a thermal writing process.
Figure 5B:
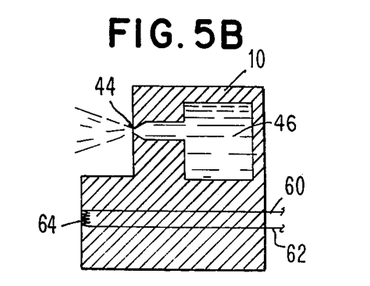
FIG. 5B is a cross-sectional view of the combination head of FIG. 5A.

FIGS. 5A and 5B illustrate a slightly different embodiment utilizing a thermal or thermographic printing process. In this figure as in the other figures similar reference numerals are utilized to identify portions which operate in an essentially identical fashion in the various embodiments. Thus, the nozzles 44 and plenum chamber 46 are the same as in the FIGS. 3A and 3B. In this embodiment, however, as will be seen in the crosssection of FIG. 5B, there are two conductors 60 and 62 passing through the main body of member 10 terminating in a heating element 64 (could be a joule effect bimetallic junction) located in surface of the body member 10. When the character generating circuitry causes current to flow through the conductors 60 and 62, heat is generated in member 64 thus producing a mark in the thermographic coating on the support medium. In this embodiment obviously there is no need for a platen 42 either built into the marking head or spaced below same. Specific solutions for use in thermographic coating processes will be enumerated subsequently.

Figure 6:
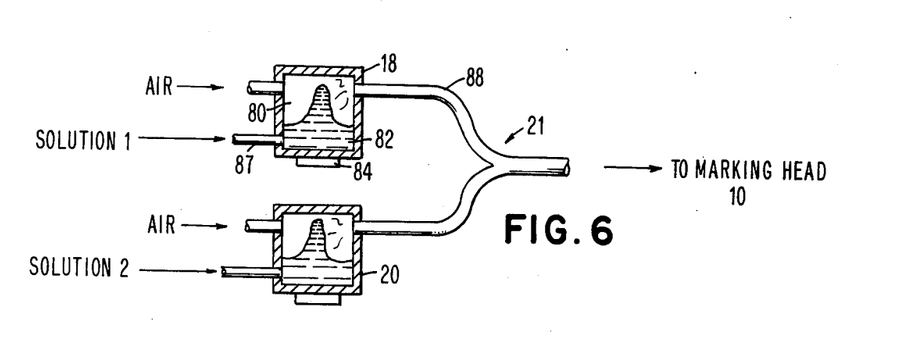
FIG. 6 is a cross-sectional view illustrating a nebulizer means for forming the required printing solution mists for use with the present invention.

Referring to FIG. 6 there is shown a particular apparatus suitable for forming the aerosol mist which may be utilized in the present invention. In this particular embodiment an internal mixing system is shown wherein the mist from the two chambers 18 and 20 meet at point 21 which is the juncture of the two tubes leading out of the nebulizing chambers and from there the combined mists are ducted into the marking head plenem chambers 46 from whence they pass through the nozzles 44 and ultimately impinge on the surface of the supporting paper.

The preferred embodiment of a device for producing a required aerosol mist is an ultrasonic nebulizer. This device will generate the required micro-mist and can be chosen from a variety of suitable commercially available devices. One such device is the DeVilbiss ultrasonic nebulizer, two of such devices being illustrated generally in FIG. 6. Although the DeVilbiss nebulizer is effective to produce micron and submicron size solution particles as required it should be understood that other forms of ultrasonic nebulization or mist generation may be employed. Further, nebulizers other than those utilizing ultrasonic transducers may be employed. For example, the Babbington nebulizer, known to those skilled in the art has been found effective to produce micron and submicron size nebulized particles suitable for use with the present invention.

Referring again to FIG. 6, each of said nebulizers comprises a chamber 80 partially filled with the fluid to be nebulized 82. A piezoelectric ultrasonic transducer 84 is attached to the bottom of the chamber. The coating solution may be continually replenished through the tube 87 to maintain a level of the fluid 82 at some optimum point.

Piezoelectric transducer 84 may be driven by a suitable oscillatory source having a frequency of the order of one megahertz. The ultrasonic vibrations from the transducer 84 when coupled to the fluid 82 act to excite or energize the fluid 82 with sufficient vibrational intensity so as to produce nebulized particles of the micron and submicron order of magnitude size in the open space of the chamber 80. Carrier gases such as nitrogen or air may be fed from a pressurized supply through the tube 86. The carrier gas acts to carry the nebulized liquid mist out of the open portion of the chamber 80 to the output tube 88. The mist is then carried via tube 88 to the mixing point 21 and then into the marking head 10 where it is directed onto the surface of the support paper 12. The nebulizing means 20 is identical to that for nebulizer and solution source 18. As will be further evident the nebulized mist may be individually transported to the marking area using an external mix system, i.e., mixed on contact, on the surface of the paper rather than mixing the two internally at the convergence of the tubes at point 21. As will be apparent, a wide variety of carrier gases may be utilized and the particular pressures and velocities used will depend upon the size of the mist particles and the force with which it is desired that such particles strike the surface to be coated for maximum adhesion and wetting.

FIG. 7 shows schematically a method for improving the wetting characteristics of such a coating system. In this figure a high voltage bias source is shown connected between the nozzles and a backing platen whereby the solution particles are caused to strike and adhere to the surface of the supporting medium 12 via electrostatic attraction. This method of improving adhesion is well known in the coating arts. Having thus generally described the basic concepts of the present invention, namely the real time in-situ formation of special purpose printing papers within a composite printing system there will follow a description of four distinct printing methods together with specific coating solutions suitable for use with the present invention.

THERMAL PRINTING SYSTEMS

Chemical compounds are chosen for the coating of the paper which are sensitive to thermal writing process such as thermal joule heating of electrical devices in contact with the paper or conceivably via a direct laser beam. Since the heat required for inducing the thermal reaction is applied when the chemical compounds may be chosen to be in the liquid state, it is not required to applyan amount of heat necessary for the melting of the compounds. This yields higher thermal sensitivity during recording but lower sensitivity to ambient temperature after the recording when the materials are dry. This, of course, results in a system that is less subject to shelf discoloration when stored in high heat conditions.

The chemicals can be heated to just below the reaction temperature prior to deposition on the paper. This gives a greater sensitivity during the actual thermal writing process.

A wide variety of chemicals may be used since the chemicals can be applied in a liquid state in which they are thermally sensitive and subsequent evaporation of solvents can result in thermal insensitivity. Also the thermally induced reactions can be of the type where the reaction takes place in a solvent form resulting in precipitation of the dye while subsequent evaporation leaves chemicals thermally insensitive (inert). Further, the mist can be caused to saturate only the surface layers of the paper whereby rapid drying of the paper following the thermal writing process is possible.

Many materials which have previously been used in thermal technologies may be used in the instant printing precess. In particular those materials which do not require separation of thermally reactive compounds are suitable. Other materials which do not have satisfactory shelf life when mixed may also be utilized herein. This requires independent deposition from the aerosols wherein the mixing takes place directly on the paper. This would obviously utilize a two-nozzle deposition system such as suggested in FIGS. 4A and 8. Materials suitable for thermal deposition are listed as follows:

Water based solutions consisting of phosphomolybdate, phosphotungstate and phosphovanadate salts together with stabilizing salts and mild reducing agents.

A typical solution is made as follows:

EXAMPLE I

Solution 1:
  80 gms Sodium Tungstate ($Na_2WO_4 \cdot ZH_2O$)
  Water to make 1 liter
  Add 280 gms Magnesium Chloride ($MgCl_2$)
  Filter off the precipitate and nebulize
Solution 2:
  80 gms Thiourea
  2.5 gms Ascorbic Acid
  4.0 gms Sodium Acetate ($CH_3COO\ Na$)

The solution is heated to approximately 70° C and nebulized to coat paper prior to writing with a hot stylus. Solution can also be applied by nebulization at room temperature.

EXAMPLE II

Solution 1:
  80 gms Ammonium Molybdate
  40 gms Sodium Hypophosphate ($Na_2HPO_4$)
  Water to make 1 liter
  Add 200 gms Zinc Chloride
  Filter off precipitate
Solution 2:
  Add 80 gms Thiourea
  2.5 gms Chloracetic Acid
  4.0 gms Sodium Acetate

EXAMPLE III

Solution 1:

A solution of 100 gms/liter of Sodium Tungstate is nebulized separately and mixed at the paper surface with a nebulized solution of:
Solution 2:
  50 gms/liter Thiorea
  5 gms/liter Chloracetic Acid The rapid evaporation of solvents after thermal writing produces a stable image.

PHOTOCHEMICAL PRINTING SYSTEMS

This aspect of the invention relates to printing technologies in which the printing or marking is achieved by photochemical reactions induced by a light beam incident upon the coated paper wherein the coating contains a suitable photochemical or photochromic material. Here again the photosensitive materials are applied to the paper or the support medium directly by deposition of the materials from an aerosol jet or cloud.

As stated previously, the use of the present invention allows the materials to be applied just prior to optical exposure and by using suitable solvents, it will dry extremely rapidly due to the solvent and also the fact that only the surface of the paper is wetted. Thus, the user is presented with a dry record immediately following the printing or marking operation. Additionally, the photochemical or photochromic reactions take place in a liquid state rather than a solid state with a subsequent increase in the photographic speed and sensitivity in many materials. Further, the materials are mixed just prior to use on the paper by suitably choosing two or more aerosol solutions whereby a much wider range of materials can be used which otherwise would not have adequate shelf life.

The inherent characteristics of the presently disclosed system offer particular advantage in the photo recording area since virtually any paper or substrate may be used and no special wet strength characteristics are required. Further and quite importantly a wide variety of ambient conditions may be used and controlled so that optimal reaction conditions and optical sensitivity may be tailored into the particular recording system.

The following is a list of solutions which would be suitable for use with a photo recording head:

PHOTOCHEMICAL PRINTING

Examples of solutions suitable for photochemical printing include the leuco form of certain solutions of triaryl-methane-dye cyanides in water. Preferred embodiments in this group include water-based solution of acid fuchsine cyanide and acid violet 6B cyanide.

For nebulization of solutions of the above type from a bulk solution, a water-based solution containing 50 gms/liter of acid violet 6B cyanide or acid fuchsine cyanide is suitable, however, the concentration can be increased as needed until the viscosity of the solution is approximately 20 centipoise. For triarylmethane-dye cyanides solutions with greater viscosity, ultrasonic nebulization of a film of liquid is preferred.

Acid Fuchsine Cyanide:

Acid violet 6B cyanide:

Other examples of suitable triarylmethane dye cyanides are described on pp. 372-375 of Light Sensitive Systems by J. Kosar, John Wiley & Sons, New York, 1965.

In addition to the above solutions other water insoluble dye cyanides can be used by dissolving them in suitable organic solvents, e.g., alcohols, acetic acid, etc. (see J. Kosar, p. 371).

It will be noted that an optical recording system has not been specifically illustrated, however, optical recording means using photo-sensitive recording materials are extremely well known in the art. It would require a suitable deflection means to traverse a beam across the paper and switch means to turn said beam on and off as required, to obtain the desired character pattern. Also, of course, we can coat the entire paper and expose to an image of a printed page in order to achieve a full page copy, i.e, copying process.

ELECTROLYTIC/ELECTROCHEMICAL PRINTING TECHNIQUES

This particular printing technique is particularly well-adapted to use with the present invention and is per se well-known in the coated paper printing arts. In this type of printing, marking is achieved by chemical reactions induced by applying a voltage to an electrode in contact with a paper substrate containing suitable reactive materials. The specific printing elements shown in FIGS. 3A and 4A are particularly adapted to this form of printing technique. The advantages enumerated previously with the other printing techniques similarly apply for electrolytic printing methods. Only the surface of the paper is wetted by the mist just prior to the contacting of the paper by the electrode. This allows the reaction to take place in a wet chemical system which generally increases the sensitivity of the reaction. However, the applied mist may be chosen to dry very rapidly by suitably choosing the solvents and thus, from the standpoint of the user, the paper is dry almost immediately following the printing operation. Further, since only the surface of the paper need be wetted it is not required to have papers with significant wet strengths. As with all the other systems, the printing may occur on almost any type of paper without the need for special coatings. Chemical shelf life is eliminated as a problem and a much wider variety of coating solution chemicals may be utilized since the mixing of the chemicals takes place immediately prior to the printing operation and only a momentary shelf life is required. A wide variety of ambient conditions is also possible with this process such as heating one or more of the solutions prior to the printing operation or conceivably even cooling one to a lower temperature.

A number of exemplary solutions are listed below that would be suitable for use with the present invention.

EXAMPLE I

Solution 1:
  Water to make 1 liter
  160 gms/liter Catechol (O-dihydroxybenzene)
  20 gms/liter Potassium Chlorate
Solution 2:
  Water to make 1 liter
  16 gms/liter Sodium Phosphate
  40 gms/liter Potassium Nitrate The anode of the electrolytic recording stylus is iron and the above solution is nebulized just prior to application to the paper. Printing is achieved by passing current between the iron anode and platinum or noble metal coated cathode. Conduction takes place in surface layer of chemicals between the electrodes. The writing process involves iron ions injected from anode and results in some anode erosion.

EXAMPLE II

Solution 1:
  Solution containing:
  100 gms/liter Methyldisalacetic acid
  20 gms/liter Potassium Ferrocyanide
  5 cc/10 Normal $H_2SO_4$
  Water to make 1 liter
  Nebulize and coat paper.
  Use platinum on noble metal coated electrodes.

A prussian blue color ensues when conduction occurs through the surface layer of chemicals which is deposited just prior to writing.

EXAMPLE III

Solution 1:
  180 gms/liter Methyldisalecetic acid
  100 gms/liter Potassium Nitrate
Solution 2:
  150 gms/liter Boric Acid
  Nebulize and apply to paper.

Printing is accomplished with conduction of electricity between an array of small iron electrodes (anodes) and broad area electrode as described previously.

PRINTING UTILIZING ELECTROLESS PLATING TECHNIQUES

According to a further aspect of the invention electroless plating of electrolytically deposited metal such as silver images may be utilized as a means for increasing the allowed printing speed and achieving image amplifications of the order of $10^6$. Such a printing system has the advantage of being very fast since very small recording currents are required to effect or initiate the marking phenomonon. It is a variant of the electrolytic recording process described previously in that the initial image is formed electrolytically and then the electroless chemical reaction continues without recording current, thereby developing the image to high density. However, such an electroless system utilizing prior techniques, known in the art, has a major disadvantage in that the original recording must be done on paper which is saturated with an electrolyte and the silver is deposited from an electrode. The electrolytic silver is then plated up in an electroless bath which is highly unstable at the temperatures (Approximately 70° C) suited to fast image enhancement (Approximately 5 seconds). The recording process, therefore, must be wet and further, the lifetime of the electroless plating bath which is only 4 minutes is a severe disadvantage.

By utilizing the present invention with electroless recording techniques, the electrolyte for deposition of the original image forming metal may be deposited from a mist as described previously, or a presoaked or factory made paper may be used. In such an embodiment the electrolytic image formation would be formed in the conventional manner using a pre-treated paper and a conventional recording apparatus. According to the present invention, the electroless plating solution could then by sprayed on the partially developed surface (very small recording currents could now be used) and the electroless plating process would proceed.

The chemicals for the electroless development process, e.g., a two-component mixture of solutions, may be heated and nebulized separately and not allowed to mix until they are both introduced to the surface of the paper. As stated above, once mixed, the electroless bath has a useful lifetime of the order of 4 minutes.

The invention thus allows electroless plating to be used satisfactorily since the wet electrolyte solution is only on the surface of the paper and, in those cases where the electrolyte for the original metal is also deposited from a mist, rapid drying after recording and development may take place. Further, the lifetime of the individual components of the electroless bath is quite large in the unmixed condition and would not require continuous replacement. Since only minute quantities of metal are deposited by the original writing electrode, there is very slight electrode erosion while, at the same time, a great increase in writing speed is possible. Increased temperature of the electroless solutions may also be used to increase the speed of plating since the bath life is no longer limited by the usual bath degradation when the bath is premixed.

The following comprises a list of suitable electroless plating solutions which could be utilized with the present invention.

ELECTROLESS PLATING BATH FOR A SILVER ELECTROLYZED ONTO PAPER (see D. R. Turner et al, J. Electrochem. Soc., Vol. 119, p. 1235, July 1971)

Solution 1:
Copper Sulfate ($CuSO_4 \cdot 5H_2O$): 40 g/l
Rochelle Salt ($NaKC_4H_4 \cdot 4H_2O$): 100 g/l
Potassium Hydroxide (KOH): 40 g/l
Solution 2:
Para formaldehyde $(HCHO)_3$: 130 g/l
Potassium Hydroxide (KOH): 120 g/l The solutions are each heated to the neighborhood of 60°-70° C and nebulized independently and introduced to the paper via ducts and air flow. The aerosols are caused to wet the surface of the paper at which time they mix and form the electroless plating solution which plates up silver deposited in a prior electrolytic deposition. The printed image is developed up in a few seconds and the electroless solution which does not evaporate, decomposes to an inactive state within a few minutes. Other electroless plating baths for developing electrolytically deposited gold, platinum or palladium are cited in U.S. Pat. No. 3,650,747, Ennio Calligaris et al. Likewise, electroless plating baths for iron, nickel, etc. are well known to those skilled in the art.

CONCLUSIONS

As will be apparent from the preceding description of four different marking technologies, the present invention is applicable to a wide range of coated paper recording, printing, and copying systems. The many advantages of the invention essentially make practical types of printing which either had very limited applicability or were virtually laboratory curiosities, such as electroless plating. The application of the coating solution immediately prior to the printing operation literally frees the recording technique from considerations such as shelf life, need for special papers, ambient condition control, etc.

It will, of course, be apparent that there are many design approaches to the specific hardware utilized. Also there are many specific coating solutions and printing technologies which can be utilized. It will be understood that it is not intended that the scope of the present disclosure and claims be limited by the preferred embodiments disclosed herein.

What is claimed is:

1. A non-impact recording process including the forming of an energy sensitive surface on a support medium in real time with respect to said recording operation, from a plurality of materials which will produce a visible mark on said surface in response to the impingement of an external energy sources thereon, said process comprising:
   forming at least two solutions from said materials with suitable solvents,
   forming said solutions into a finely divided mist,
   directing said mist onto the surface of said support medium with sufficient velocity to wet same and to form a composite uniform coating thereon, and
   selectively exposing said coating to said external energy source to form visible images thereon immediately after forming said coating.

2. A non-impact recording process as set forth in claim 1 including forming at least two separate mists from said solutions and directing same separately onto the surface of said medium wherein they are caused to form a uniformly mixed coating on said surface.

3. A non-impact recording process as set forth in claim 1 including forming at least two separate mists from said at least two separate solutions and premixing same in a suitable chamber prior to contacting said support medium whereby a uniform mixture of said mist is formed in said chamber and directing said uniform mixture in turn, to impinge upon the surface of said support medium and wet same.

4. A non-impact recording process as set forth in claim 1 including directing said mist upon said support medium as discrete sprays from a plurality of separate nozzle orifices so spaced on a coating head that a uniform coating is obtained on said surface.

5. A non-impact recording process as set forth in claim 1 including directing said mist as a continuous spray across said support medium through a narrow slit covering substantially the width of said support medium whereby a uniform coating is applied to the surface of said medium.

6. A non-impact recording process as set forth in claim 1 wherein said energy source comprises thermal energy, said process including selectively heating said coated surface of said support medium in those areas where it is desired to produce a visible mark, and
wherein said materials are chosen to form a visible mark upon the application of heat thereto.

7. A non-impact recording process as set forth in claim 1 wherein said energy source comprises electric current, said process including causing electric current to flow through desired areas of said coated surfaces where a visible mark is desired, and
wherein said materials are chosen so that they form a visible mark upon the passage of current therethrough.

8. A non-impact recording process as set forth in claim 1 including forming said visible image by impinging light thereon in selected areas where it is desired to produce a visible mark, and
choosing photo-sensitive coating materials such that they are sensitive to and form a visible image upon the application of light of a suitable wavelength, and
stabilizing said coating subsequent to the application of light to the selected areas thereof, whereby no further image is produced by the impingement of ambient light thereon subsequent to the recording process.

9. A non-impact recording process as set forth in claim 8 including impinging a complete photo-image of an image which is to be recorded, upon, said coated support medium.

10. A non-impact printing system including a paper support medium which is substantially non-sensitive to the impingement of an external energy source thereon,
means for continuously passing said support medium past a recording station,
means included in said recording station for forming a mist from at least two separate solutions which when mixed form a composite material which will form a visible image when exposed to a suitable external source, and
means for causing said mist to be directed onto the surface of and form a uniform coating on said surface,
means for applying an external energy source to said surface in selected areas where it is desired to make a visible mark immediately subsequent to said coating operation, and
means for continuing said coating and recording process to form desired images on said surface.

11. A non-impact printing system as set forth in claim 10 including,
means for forming and premixing at least two mists from said separate solutions prior to their application to said surface, and
means for directing the combination mist in turn upon said surface to form said uniform coating.

12. A non-impact printing system as set forth in claim 10 including nebulizer means for forming said mist,
wherein separate solutions are supplied to said nebulizer and the resultant nebulized mist is formed from each of said solutions.

13. A non-impact printing system as set forth in claim 12 wherein said nebulizer means includes a chamber into which a desired solution is placed, and
transducer means for vibrating said chamber to cause wavelets to form on the surface thereof, whereby droplets are formed in the upper portion of said chamber which droplets form a mist,
means for introducing a carrier gas to said chamber to remove said mist and deposit same upon the surface of said support medium to be coated by said mist.

14. A non-impact printing system as set forth in claim 10 including:
means in said recording head to heat discrete areas of said coated surface to form visible images on the surface of said support medium.

15. A non-impact printing system as set forth in claim 10 including:
means in said recording head to cause current to flow in discrete areas of said coated surface to form visible images on the surface of said support medium.

16. A non-impact printing system as set forth in claim 10 including:
means in said recording head to illuminate discrete areas of said coated surface with light of suitable wavelength to form visible images on the surface of said support medium.

* * * * *